United States Patent [19]

Uemura

[11] 3,742,134

[45] June 26, 1973

[54] VISUAL RECORDING SYSTEM FOR VIDEO SIGNAL

[76] Inventor: Saburo Uemura, 4394 Kamariv-machi, Kanazawa-ku, Yokohama-shi, Kanagawa-ken, Japan

[22] Filed: Mar. 16, 1971

[21] Appl. No.: 124,879

Related U.S. Application Data

[63] Continuation-in-part of Ser. No. 757,034, Sept. 3, 1968, abandoned.

[52] U.S. Cl. ..... 178/6.6 DD, 178/DIG. 3, 178/6.6 R

[51] Int. Cl. ........................................ H04n 1/28

[58] Field of Search .................... 178/DIG. 3, 6.6 R, 178/6.6 A, 6.6 DD, 6.6 FS, 100.2 T

[56] References Cited

UNITED STATES PATENTS

| | | | |
|---|---|---|---|
| 3,284,567 | 11/1966 | Southworth | 178/DIG. 3 |
| 3,355,551 | 11/1967 | Prestigiacomo | 179/100.2 T |
| 3,397,283 | 8/1968 | Stosberg et al. | 178/6.6 FS |

*Primary Examiner*—J. Russell Goudeau
*Attorney*—Lewis H. Eslinger et al.

[57] ABSTRACT

A system for the visual recording of a video signal records one field or frame of the video signal on a rotary magnetic recording medium, such as a magnetic disk, and then repeatedly reproduces the recorded signal. A portion of the repreatedly reproduced signal is sampled at each horizontal synchronizing signal period thereof, and controls a recording element, such as a discharge electrode, which discolors or otherwise visually alters a recording paper in correspondence with the amplitude of the sampled signal. The recording paper is supported on a cylindrical surface for relative movement with respect to the recording element both axially and in rotation by a mechanical interconnection to the rotary magnetic recording medium, and the position of sampling of the reproduced signal is sequentially shifted at every relative rotation of the recording paper and element while the relative axial movement is synchronized with such relative rotation.

8 Claims, 7 Drawing Figures

INVENTOR.

SABURO UEMURA

BY

ATTORNEYS

INVENTOR.

SABURO UEMURA

BY Lucas H. Eslinger

ATTORNEYS

INVENTOR
SABURO UEMURA
BY
Lewis H. Eslinger
ATTORNEY

VISUAL RECORDING SYSTEM FOR VIDEO SIGNAL

This application is a continuation-in-part of my copending application for U.S. Letters Patent identified as Ser. No. 757,034, filed Sept. 3, 1968, and abandoned subsequent to the filing of this application.

This invention relates generally to the recording, in visual form, of video signals, and more particularly is directed to a system by which one field or frame of a video signal may be reproduced in a permanent visual or graphic form.

Devices have been heretofore proposed for recording television signals, document signals and the like on magnetic recording tape, but difficulty has been encountered in visually recording such signals on a recording paper in the form of fixed image pictures. Such difficulty usually involves the introduction of distortions or "jitters" in the visually or graphically recorded picture, for example, as produced by a facsimile printing machine.

Accordingly, it is an object of this invention to provide a system or apparatus by which a video signal representing a scene or document can be visually recorded without jitter or distortion to afford an accurate picture or graphic representation of the scene or document.

Another object of this invention is to provide a visual recording system with which video signals of high frequency are recorded at relatively low speed to permit the use of existing electrical discharge or electrochemical tenchiques for effecting such recording.

In accordance with an aspect of the invention, a magnetic memory or recording device having a rotary magnetic medium, such as, a disk, is employed to record, and then repetitively reproduce one field or frame of a video signal, whereupon a portion of the repeatedly reproduced signal is sampled at each horizontal synchronizing signal period and controls a recording element, such as a discharge electrode, which visually alters, for example, discolors, a recording paper in correspondence with the sampled signal, and the recording paper is supported on a cylindrical surface for relative movement, both in rotation and axially with respect to the recording element, by means of a mechanical interconnection with the rotary magnetic medium, with the position of sampling of the reproduced signal being sequentially shifted at every relative rotation of the recording paper and element while the relative axial movement thereof is synchronized with such relative rotation.

In one embodiment of the invention, the recording paper is secured on the outer surface of a support cylinder which is mechanically connected with the rotary magnetic medium for rotation with the latter, and the recording element is non-rotatable and moved axially along the cylinder in response to rotation of the latter.

In another embodiment of the invention, the recording paper is secured on the inner surface of a cylindrical support moved parallel to the axis of rotation of the recording element which is mechanically coupled to the rotary magnetic medium for rotation with the latter.

The above, and other objects, features and advantages of this invention, will become apparent from the following description of illustrative embodiments which is to be read in conjunction with the accompanying drawings, in which.

Figure 1:
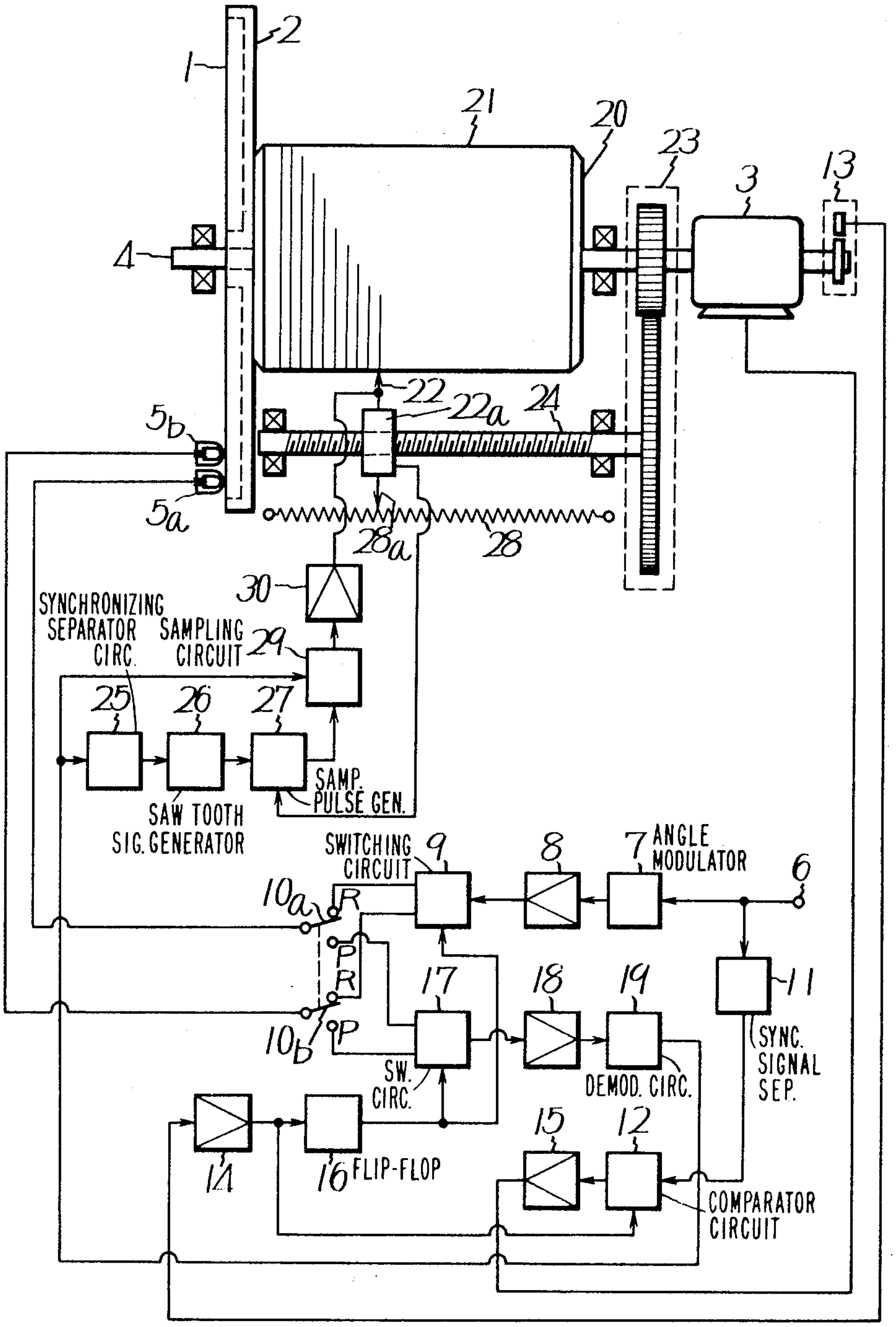
FIG. 1 is a schematic diagram illustrating one embodiment of a visual recording system for video signals according to this invention.

Referring to the drawings in detail, and initially to FIG. 1 thereof, it will be seen that the system or apparatus according to this invention, as there shown, employs a rotary magnetic sheet unit as a memory device. Such memory device includes a rotary magnetic sheet stretched on a frame or turntable 2, which is mounted on a rotary shaft 4 driven by a motor 3. On the rotary magnetic sheet 1 a video signal of one field is recorded in the form of one annular magnetic track. Magnetic heads **5*a* and 5*b* are spaced in the radial direction of the rotary magnetic sheet 1** and supported in contact therewith in a manner to trace thereon different concentric circular magnetic tracks.

A video signal from an input terminal 6 is applied to an angle modulator 7, and the modulated output of the latter is fed to a switching circuit 9 through an amplifier 8. Two outputs of the switching circuit 9 are respectively applied to the magnetic heads **5*a* and 5*b* through recording contacts R of change-over switches 10*a* and 10*b*. A portion of the video signal fed to the input terminal 6 is applied to a synchronizing signal separator circuit 11, and a vertical synchronizing signal separated from the video signal by circuit 11 is applied to a comparator circuit 12. In order to obtain a signal indicating the rotational angle or position of the rotary magnetic sheet 1, a pulse generator 13 consisting of, for example, a rotary magnet and a detecting coil is mounted on rotary shaft 4. The output of the pulse generator 13 is fed through an amplifier 14 to the comparator circuit 12, in which the vertical synchronizing signal is compared with the output of the pulse generator 13, and the resulting output is fed to the motor 3 through a servo amplifier 15. In this manner, the rotary magnetic sheet 1 is driven in synchronization with the vertical synchronizing signal of the video signal applied to the terminal 6 so as to cause one revolution of sheet of disk 1, and, therefore, to cause heads 5*a* and 5*b* to each trace one circular magnetic track on the magnetic sheet 1 for each field of the video signal. The switching circuit 9 is controlled by the output of a change-over circuit, for example, a flip-flop circuit 16 supplied with a portion of the output of the amplifier 14, that is the amplified output of the pulse generator 13, with the result that signals of odd number and even number fields are respectively recorded on the rotary magnetic sheet 1 by the magnetic heads 5*a* and 5*b*.**

The signals thus recorded in circular magnetic tracks on sheet 1 are reproduced by magnetic heads 5*a* and 5*b*. The reproduced signals are applied to a second switching circuit 17 through playback contacts P of the change-over switches 10*a* and 10*b*, and the common output, that is, the composite output of the switching circuit 17, is fed to an angle demodulator circuit 19 through an amplifier 18, thus demodulating the video signal applied to the terminal 6. Further, rotation of the rotary magnetic sheet 1 leads to repetitive playback of the video signal of one field at each revolution of the sheet 1, and change-over of the magnetic heads 5*a* and 5*b* for successive revolutions of the sheet 1 results in repetitive reproduction of the video signal of one frame at every two revolutions of the sheet 1.

For visually recording the scene, document or the like represented by the signal magnetically recorded on sheet 1, the system or apparatus according to this invention is further shown to include a cylindrical member 20 mounted on the rotary shaft 4 for rotation precisely in synchronism with the rotary magnetic sheet 1. A recording paper 21 is wound round the cylindrical member 20 and suitably secured thereto. A recording element, for example, a discharge electrode 22, is disposed in contact with or opposite to the recording paper 21 and a current is applied between the discharge electrode 22 and the cylindrical member 20 to discolor the recording paper 21 at selected dots or areas, by discharge or electrochemical action, in proportion to the impressed current, thereby providing a visual record on paper 21. The discharge electrode 22 is shifted a small distance in the axial direction of the cylindrical member 20 at each revolution of magnetic sheet 1. The extent of this shift or axial displacement for each revolution is dependent upon the desired resolution. For example, when one horizontal scanning line is to consist of 300 dots, the discharge electrode 22 is moved in the axial direction by one three-hundredth of the length of the horizontal scanning line on the recording paper at every vertical syncyronizing signal period, that is, at every revolution of the rotary magnetic sheet 1. To effect such axial movement, a reduction gear mechanism 23 is driven by the rotary shaft 4 and a feed screw 24 is rotated by the reduction gear mechanism 23 and extends parallel with the rotary shaft 4. The feed screw 24 is engaged threadably with a support 22*a* for the discharge electrode 22. With such an arrangement, rotation of feed screw 24 leads to the gradual movement of the support 22*a* of the discharge electrode 22 in the aforementioned relationship.

As the video signal for a field is being repeatedly reproduced from sheet 1, a portion of the reproduced video signal for each horizontal scanning line is sampled and the sampled signal is visually recorded on the recording paper 21, with the sampling position in each horizontal scanning line being sequentially shifted for each repetition of the reproduced video signal representing a field. To perform the foregoing functions, part of the output of demodulator 19 is applied to a synchronizing signal separator circuit 25 to separate the horizontal synchronizing signal. The separated horizontal synchronizing signal is then applied to a sawtooth signal generator circuit 26 to produce a sawtooth signal synchronized with the horizontal synchronizing signal, and that sawtooth signal is fed to a sampling pulse generator circuit 27. The sampling pulse generator circuit 27 also receives a ramp wave signal which gradually increases in voltage in response to movement of the discharge electrode 22 in the axial direction. In the embodiment shown on FIG. 1, a potentiometer 28 is arranged parallel to the path of movement of discharge electrode 22 and a moving terminal or slider 28*a* of the potentiometer 28 is secured to the support 22*a* to cause the ramp wave signal to gradually vary with the movement of the discharge electrode 22 in the axial direction. When the ramp wave signal coincides in amplitude with the sawtooth wave signal from the sawtooth wave signal generator circuit 26, the sampling pulse generator circuit 27 generates a sampling pulse. The sampling pulse thus derived from the circuit 27 is applied to the gate or sampling circuit 29 which thereby passes the reproduced video signal from the demodulator circuit 19 through an amplifier 30 to the discharge electrode 22.

Figure 2:
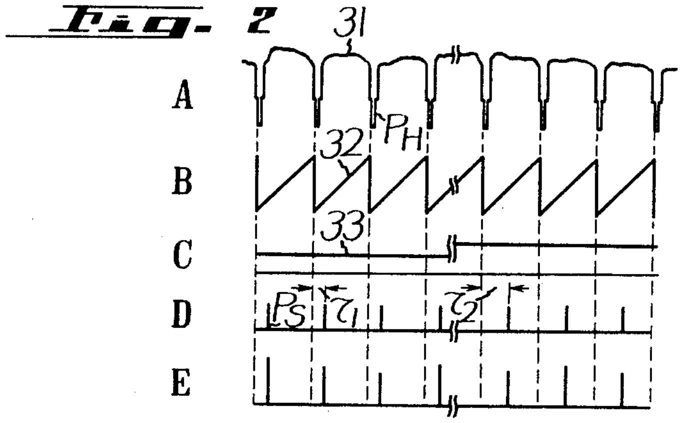
FIG. 2 shows waveform diagrams to which reference will be made in the description of the recording system shown in FIG. 1.

The video signal 31 demodulated by the demodulator 19 is shown in FIG. 2A to include a horizontal synchronizing pulse $P_H$. For convenience in the following description, it is assumed that the discharge electrode 22 moves one pitch at every revolution of the rotary magnetic sheet 1. Consequently, the potentiometer 28 produces a stepped wave signal whose level is sequentially varied at every revolution of the rotary magnetic sheet 1. The sawtooth wave signal from the sawtooth wave signal generator circuit 26 is indicated at 32 on FIG. 2B and is shown to be synchronized with the horizontal synchronizing signal $P_H$, while the output of the potentiometer 28 is indicated at 33 on FIG. 2C and is shown to maintain a certain voltage during each revolution of the rotary magnetic sheet 1. Accordingly, sampling pulses $P_S$ are obtained from the sampling pulse generator circuit 27 at those times when the signals 32 and 33 are of the same amplitude, as shown on FIG. 2D. The sampling pulses $P_S$ are thus delayed by $\tau_1$ behind the horizontal synchronizing signal $P_H$ during one revolution of the rotary magnetic sheet 1. As a result of this, the sampling circuit 29 passes signals, such as are depicted in FIG. 2E, which are delayed by $\tau_1$ behind the horizontal synchronizing pulses $P_H$ of the video signal for each horizontal scanning period.

Figure 3:
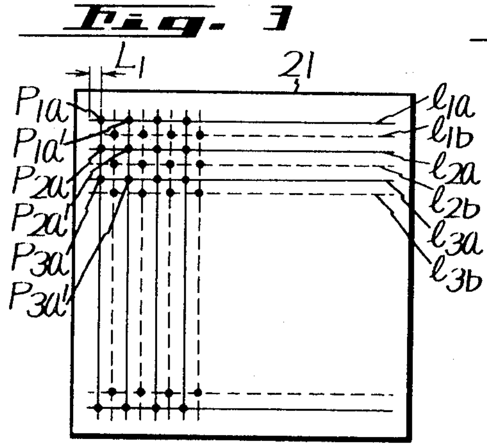
FIG. 3 is a schematic diagram showing the order in which elements of a picture are sequentially produced in the recording system of FIG. 1.

Referring now to FIG. 3, the recording paper 21 is there shown spread flat with its axial direction extending laterally from left to right. With such arrangement of the recording paper, the horizontal scanning lines of the reproduced picture run in the lateral direction, for example, as represented by horizontal scanning lines $1_{1a}$, $1_{2a}$, $1_{3a}$, . . . . . . of successive even number fields. During the first revolution of cylinder 20 with sheet 1, the sampled signals depicted in FIG. 2E are sequentially recorded on the horizontal scanning lines at locations $P_{1a}$, $P_{2a}$, $P_{3a}$, . . . . . spaced a distance $L_1$ from the start positions of the horizontal scanning lines in accordance with the time lag $\tau_1$ between the horizontal synchronizing pulses $P_H$ and the sampling pulses $P_S$. During the next revolution of rotary magnetic sheet 1, discharge electrode 22 is shifted one pitch on feed screw 24 and the output voltage of potentiometer 28 is correspondingly increased, so that the sampling pulses $P_S$ are delayed by the time $\tau_2$ , which is greater than $\tau_1$ by $\Delta t$, from the horizontal synchronizing pulses $P_H$, and consequently the sampling position of the video signal is also shifted by $\Delta t$. As a result, the sampled signals are recorded at points $P_{1a}'$, $P_{2a}'$, $P_{3a}'$, . . . . .which are shifted to the right from the previous recording points by a distance corresponding to one pitch of feed screw 24. In this manner, the discharge electrode 22 is successively shifted, by one pitch of feed screw 24, at each revolution of the rotary magnetic sheet 1 so that the sampling position for each horizontal scanning period and the recording position on the recording paper are correspondingly shifted. In short, with the apparatus as described above, a television picture is scanned so that one scanning line is formed by the discharge electrode 22 on the recording paper 21 in the direction substantially at right angles to the horizontal scanning lines of the picture during each field period of the reproduced signal from the rotary magnetic sheet 1. The illustrated example employs interlaced scanning and, in that case, the odd number field may be recorded on the horizontal scanning lines $1_{1b}$, $1_{2b}$, $1_{3b}$, . . . . .by scanning such lines substantially at right angles thereto and recording thereon the sampled portions of the video signal picked up by the magnetic head *5b*. With interlaced scanning, apparent resolution can be further enhanced by shifting, by half a pitch of feed screw 24, the scanning lines of the discharge electrode 22.

With the recording system according to this invention as described above, the video signal of wide frequency band is recorded in the form of a dot for each horizontal scanning period in a full period, and the circumferential line on cylinder 20 at which recording is effected is shifted at every field, so that recording can readily be achieved with a device constructed as previousy described. This recording may be effected by discharge of electrochemical recording, or by heat sensitive or pressure sensitive recording or the like, as employed in so-called facsimilar printing.

Inexpensive and high-speed recording can be effected by the use of a recording paper having a metallic film of aluminum, tin or the like vapor-deposited thereon, in which case recording is achieved by melting and removing the deposited layer at selected areas by discharging or applying a current thereto. This method avoids the generation of dust and odors and facilitates copying of the record from the recording paper. Since the rotary magnetic sheet 1 and the cylindrical member 20 having wound thereon the recording paper 21 are mechanically interconnected, for example, mounted on the same rotary shaft 4, as shown, faithful recording is ensured without generating the so-called jitter component which causes distortion of the recorded picture.

If the video signal of one field is correctly recorded in an endless manner on the magnetic sheet 1, that is, in a circular track on sheet or disk 1, it is not always necessary to drive the magnetic sheet 1 at such a speed as to rotate once for each field period of the video signal. Thus, the rotary magnetic sheet 1 may be driven at any desired speed, so long as the frequency of the reproduced signal does not greatly differ from that of the recorded signal.

Figure 5:
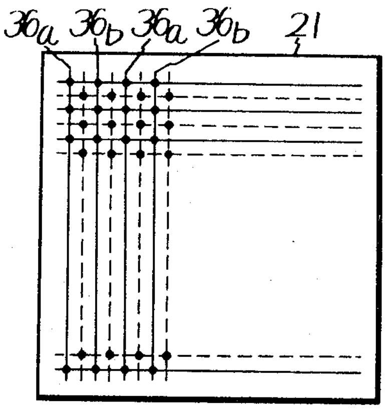
FIG. 5 is a view similar to that of FIG. 3, but with reference to the system depicted in FIG. 4.
Figure 4:
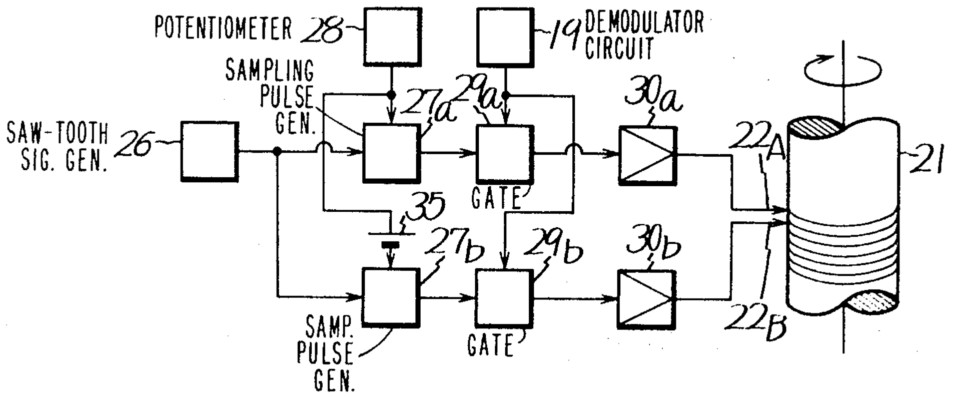
FIG. 4 is a block diagram illustrating another embodiment of a visual recording system according to this invention.

In FIG. 4 there is illustrated another embodiment of this invention in which two discharge electrodes 22A and 22B are employed to effect recording simultaneously at two points in the same horizontal scanning period. The two discharge electrodes 22A and 22B are in contact with the recording paper 21 at locations spaced a predetermined axial distance from each other, and receive sampled portions of the reproduced signal which are displaced in phase in correspondence with the distance between the discharge electrodes. To this end, two sampling pulse generator circuits *27a* and *27b* are provided and receive the output from the sawtooth wave signal generator circuit 26 and the output of the potentiometer 28. In this case, a DC voltage from a DC voltage source 35 is superimposed on the ramp wave signal fed from potentiometer 28 to one of the sampling circuits, for example, to sampling circuit *27b* and corresponds to the distance between the two discharge electrodes 22A and 22B. The sampling pulses derived from circuits *27a* and *27b* are respectively applied to gate circuits *29a* and *29b*, which are supplied with the output of the demodulator circuit 19. The sampled outputs from the gate circuits *29a* and *29b* are respectively fed to the discharge electrodes 22A and 22B through amplifiers *30a* and *30b*. In such a case, the sampled outputs from circuits *29a* and *29 b* are simultaneously recorded at lines *36a* and *36b* on the recording paper 21, which lines extend substantially at right angles to the horizontal scanning lines, as shown on FIG. 5, and hence the recording time can be shortened.

Although the signal from the potentiometer 28 has been assumed to be a stairstep wave signal in the foregoing, it will be understood that it may be a continuously changing or ramp wave signal. In the foregoing examples, the rotary magnetic sheet 1 and the cylindrical member 20 are mounted on the same rotary shaft 4 but they may be otherwise mechanically interconnected, for example, through gears, so as to rotate at the same speed or at different speeds which are whole multiples of each other. Further, in place of the memory device shown to comprise the fixed heads *5a* and *5b* and the rotary magnetic sheet 1, the recording apparatus according to this invention may have a memory device similar to existing video tape recorders and in which a magnetic tape extends helically around at least a portion of the periphery of a guide drum and at least one rotary magnetic head traces skewed tracks on the tape guided by the drum to record the video signal of one field or frame in each skew track. In that case, the signal of a field or frame is repeatedly reproduced when the tape is stopped and the head is continuously rotated, and accurate visual recording without jitter is achieved by providing a mechanical interconnection between the rotated head or heads of the memory device and the mechanism by which relative rotation of the recording paper and the discharge electrode is effected.

In the previously described embodiments of the invention, the recording paper 21 supported on cylindrical member 20 is rotated with the latter and the discharge electrode 22 is moved axially in synchronism with the rotation of the recording paper. Conversely, the discharge electrode or other visual recording element may be rotated, while the recording paper supported on cylindrical member is moved axially in synchronism with the rotation of the recording element. For example, as shown on FIGS. 6 and 7, an apparatus according to this invention for the visual recording of video signals may comprise a magnetic recording device similar to that shown in FIG. 1 and thus including a turntable 2 supporting a magnetic recording medium or disk 1 and carried by a shaft 4 driven by a motor 3. As before, two magnetic recording and reproducing heads *5a* and *5b* are supported adjacent medium 1 to record video signals of respective fields in circular tracks on medium 1 and to repeatedly reproduce such signals.

Figure 7:
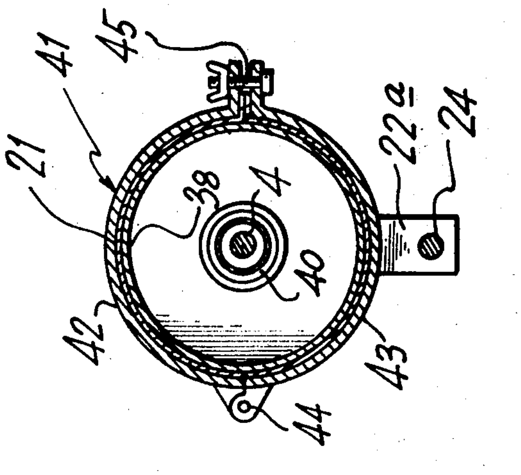
FIG. 7 is a transverse sectional view taken along the line 7—7 on FIG. 6.
Figure 6:
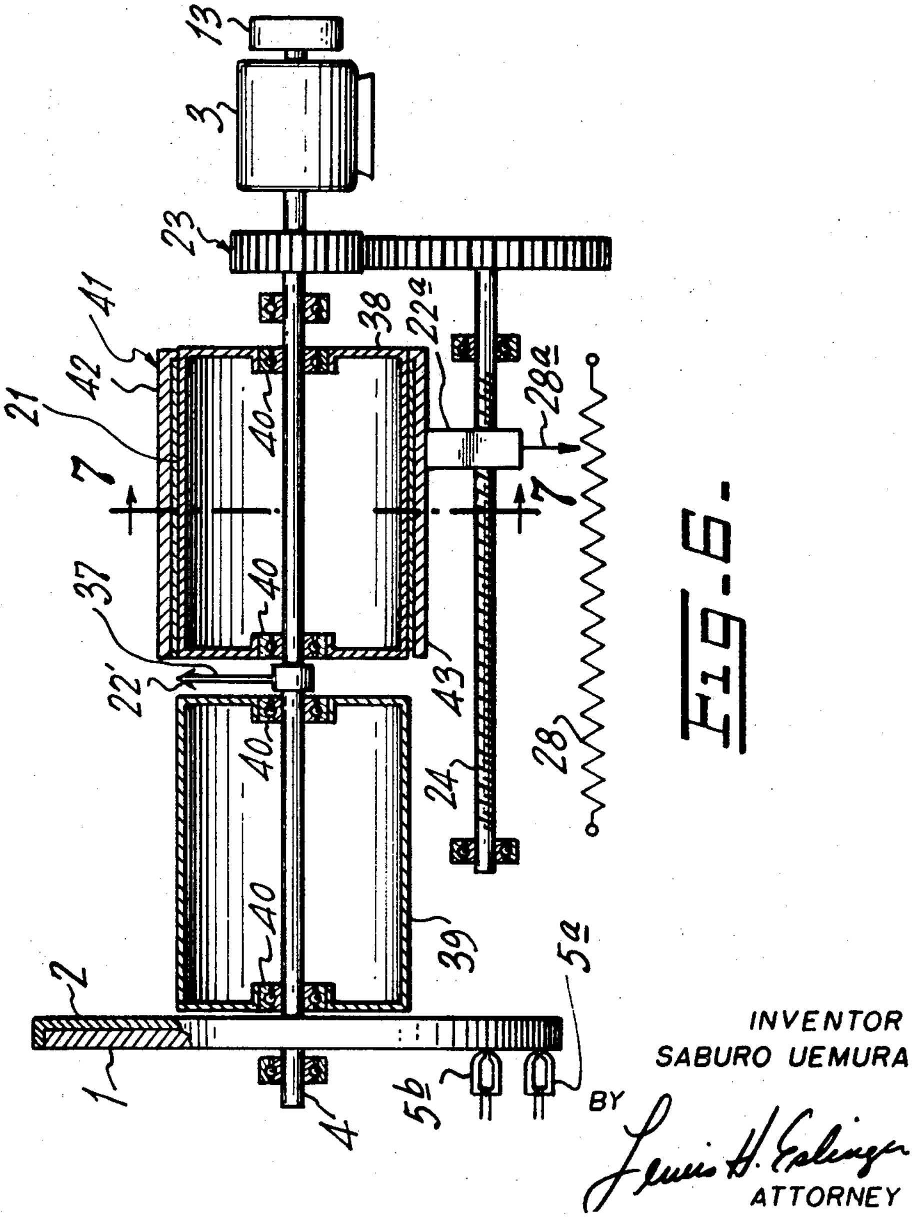
FIG. 6 is a view similar to a portion of FIG. 1, but showing another embodiment of this invention.

In the apparatus of FIGS. 6 and 7, the discharge electrode 22′ or other recording element is carried by an arm 37 extending radially from shaft 4 to move in a circular path in response to rotation of shaft 4 and recording medium 1. The circular path of movement of electrode 22' is shown located between the surfaces of a pair of cylindrical guide members 38 and 39 which are mounted on shaft 4 by bearings 40 so that guide members 38 and 39 can remain stationary while shaft 4 rotates. Further, a recording paper support 41 has an inner cylindrical surface to support recording paper 21 in surrounding relation to cylindrical guide members 38 and 39.

As shown, support 41 may include upper and lower semicylindrical shells 42 and 43 which are hingedly connected, as at 44 (FIG. 7), so that shell 42 may be raised or opened relative to shell 43, and a clamp 45 for holding the shells in closed relation around guide members 38 and 39. With shell 42 opened relative to shell 43, the recording paper 21 can be passed into the clearance between shell 43 and guide member 38 and then wrapped over the top surface of the latter. Upon closing of shell 42, the ends of the recording paper 21 may be gripped between the clamped edges of shells 42 and 43, as shown on FIG. 7, so that paper 21 is then movable axially with support 41 relative to guide members 38 and 39 and electrode 22. such movement of paper 21 is synchronized with the relative rotational movement of electrode 22 by means of gearing 23 driving a feed screw 24 from shaft 4, and a traveler 22*a* threadably receiving screw 24 and being fixed to shell 43 of support 41. The traveler 22*a* further carries the slider 28*a* of the potentiometer 28. Thus, as electrode 22' is rotated relative to recording paper 21, the paper is moved axially across the plane of rotation of the electrode and, in all other respects, the apparatus of FIGS. 6 and 7 may function in the same advantageous manner as has been described above with respect to the apparatus of FIG. 1.

Although illustrative embodiments of the invention have been described above with reference to the drawings, it is to be understood that the invention is not limited to those precise embodiments, and that various changes and modifications may be effected therein by one skilled in the art without departing from the scope or spirit of the invention.

What is claimed is:

1. Apparatus for visually recording a video signal comprising magnetic recording and reproducing means for recording at least one field of the video signal and repeatedly reproducing the recorded field signal, said recording and reproducing means including a magnetic recording medium and magnetic recording and reproducing head means which are relatively rotatable and disposed adjacent to each other, drive means mechanically connected with said recording and reproducing means to effect relative rotation of said medium and head means at a speed which achieves a single complete relative revolution thereof in an integral multiple of the field period of said video signal, a visual recording device including a recording sheet, support means having a cylindrical surface against which said sheet is mounted and visual recording means mounted adjacent said support means for relative rotational and axial movements of said support means and visual recording means with respect to each other about and along, respectively, the axis of said cylindrical surface, means mechanically connected with said drive means for effecting said relative rotational and axial movements in precise synchronism with each other and with said relative rotation of said medium and head means and achieving a complete relative revolution of said support means and visual recording means in said field period of the video signal, means for sampling one portion of the reproduced field signal for each horizontal synchronizing signal period thereof, means for operating said visual recording means in dependence on the sampled signal portion so as to correspondingly alter the appearance of said recording sheet at the location thereon then contacted by said visual recording means, and means for sequentially shifting, at each repetition of said reproduced field signal, the time in relation to each said horizontal synchronizing signal period when said portion of the reproduced field signal is sampled.

2. Apparatus according to claim 1, in which said magnetic recording medium is in the form of a rotary disk, said head means is stationary adjacent said rotary disk to record said field of the video signal in a circular track on said disk, and said drive means includes an electric motor, a shaft driven by said motor and connected to said disk, a pulse generator driven by said motor and control means for said motor comparing the output of said pulse generator with the vertical synchronizing signals of said video signal and, in response thereto maintaining a predetermined relation between the rotational speed of said disk and the field period of said video signal.

3. Apparatus according to claim 2, in which said motor is controlled to cause one complete revolution of said disk for each field of said video signal, and said means mechanically connected with said drive means for effecting the relative rotational and axial movements of said support means and visual recording means cause one complete revolution thereof for each revolution of said disk.

4. Apparatus according to claim 3, in which said support means is fixed on said shaft and said visual recording means is non-rotatable and movable along said support means parallel to said axis.

5. Apparatus according to claim 3, in which said visual recording means is fixed on said shaft to rotate therewith, and said support means is non-rotatable and movable parallel to said axis.

6. Apparatus according to claim 1, in which said recording sheet has a surface sensitive to an electrical discharge, said visual recording means includes at least one discharge electrode, and said means for operating said visual recording means applies an electrical voltage to said electrode for discharge to said support, which electrical voltage corresponds to said sampled signal portion.

7. Apparatus according to claim 6, in which said visual recording means includes another discharge electrode spaced from said one electrode in the direction of said relative axial movement, said sampling means samples another portion of said reproduced field signal which is spaced in time from said one portion, and said means for operating said visual recording means applies an electrical voltage to said other electrode which corresponds to said other sampled portion of the reproduced field signal.

8. Apparatus according to claim 1, in which said magnetic recording and reproducing head means includes two spaced heads positioned to trace respective recording tracks on said medium, and said magnetic recording and reproducing means further includes switching means to cause said two heads to record successive field signals in the respective tracks and to reproduce the field signals successively from said respective tracks.

* * * * *